(12) United States Patent
Rinjonneau et al.

(10) Patent No.: US 8,714,477 B2
(45) Date of Patent: May 6, 2014

(54) TURBOMACHINE SUPPORT PYLON FOR AIRCRAFT

(75) Inventors: Christelle Rinjonneau, Toulouse (FR); Pierre Guillaume, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 302 days.

(21) Appl. No.: 13/094,363

(22) Filed: Apr. 26, 2011

(65) Prior Publication Data
US 2011/0315813 A1 Dec. 29, 2011

(30) Foreign Application Priority Data
Apr. 27, 2010 (FR) ...................................... 10 53200

(51) Int. Cl.
*B64D 27/00* (2006.01)
*B64D 33/10* (2006.01)

(52) U.S. Cl.
USPC ................... 244/54; 244/57; 165/41; 165/44; 165/47

(58) Field of Classification Search
USPC .............. 244/54, 53 B, 55, 207–209; 60/266, 60/267, 39.08, 730; 165/41, 42, 44, 47; 248/554–557
See application file for complete search history.

(56) References Cited

U.S. PATENT DOCUMENTS

| | | | | |
|---|---|---|---|---|
| 3,783,935 A | * | 1/1974 | Simmons et al. | 244/57 |
| 5,123,242 A | * | 6/1992 | Miller | 60/226.1 |
| 5,149,018 A | * | 9/1992 | Clark | 244/117 A |
| 5,156,353 A | | 10/1992 | Gliebe et al. | |
| 5,806,793 A | * | 9/1998 | Brossier et al. | 244/57 |
| 6,715,713 B2 | * | 4/2004 | Marche | 244/57 |
| 7,716,913 B2 | * | 5/2010 | Rolt | 60/266 |
| 8,161,755 B2 | * | 4/2012 | Marche | 244/57 |
| 8,297,038 B2 | * | 10/2012 | Stretton | 60/204 |
| 2008/0245926 A1 | | 10/2008 | Journade et al. | |
| 2008/0251633 A1 | | 10/2008 | Journade et al. | |
| 2009/0301101 A1 | | 12/2009 | Marche | |
| 2011/0108662 A1 | * | 5/2011 | Diochon et al. | 244/54 |
| 2012/0168115 A1 | * | 7/2012 | Raimarckers et al. | 165/41 |

FOREIGN PATENT DOCUMENTS

| | | |
|---|---|---|
| FR | 748 657 | 7/1933 |
| FR | 2 613 688 | 10/1988 |
| FR | 2 891 248 | 3/2007 |
| WO | WO 2007/012725 A2 | 2/2007 |

OTHER PUBLICATIONS

U.S. Appl. No. 13/013,298, filed Jan. 25, 2011 Jan. 25, 2011, Christelle Rinjonneau, et al.
U.S. Appl. No. 13/013,319, filed Jan. 25, 2011 Jan. 25, 2011, Christelle Rinjonneau, et al.
French Preliminary Search Report and Written Opinion issued Jan. 12, 2011, in French 1053200, filed Apr. 27, 2010 (with English Translation of Categories of Cited Documents).

* cited by examiner

*Primary Examiner* — Joseph W Sanderson
*Assistant Examiner* — Marc Burgess
(74) *Attorney, Agent, or Firm* — Oblon, Spivak, McClelland, Maier & Neustadt, L.L.P.

(57) ABSTRACT

An aircraft support pylon designed to attach a turbomachine housed in a nacelle to an aircraft fuselage is disclosed. The pylon includes a cooler, located substantially in the vicinity of a leading edge of the pylon, and able to be heated by a hot fluid, the hot fluid intended to be cooled by heat exchange with cold air outside the cooler. The pylon also includes at least one air evacuation duct, at the exit from the cooler and extending longitudinally in an internal volume of the pylon to a trailing edge of the pylon.

11 Claims, 3 Drawing Sheets

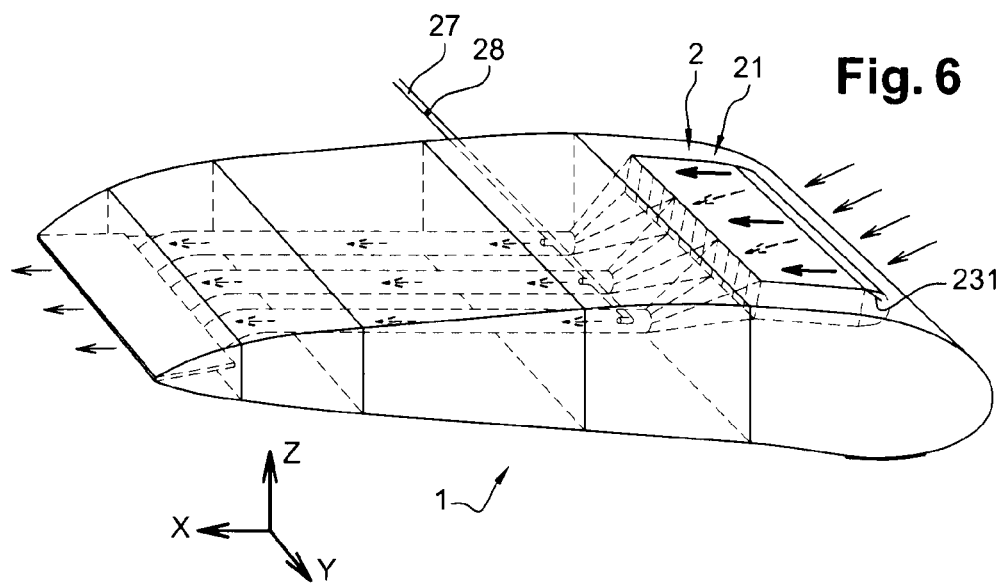
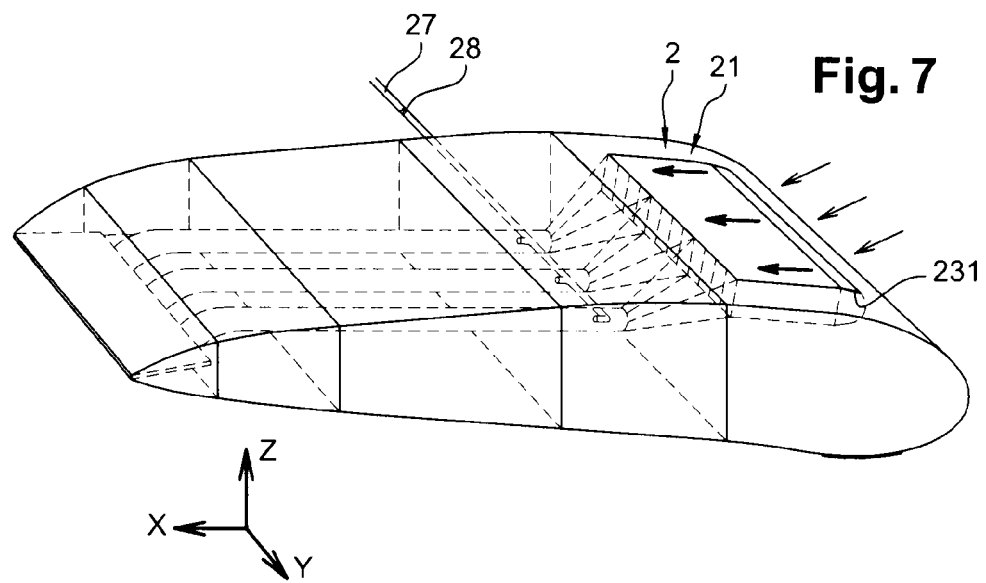

TURBOMACHINE SUPPORT PYLON FOR AIRCRAFT

BACKGROUND OF THE INVENTION

1. Field of the Invention

The present invention relates to a pylon for an aircraft, i.e. a structure that fixes a turbomachine to an aircraft fuselage. More specifically, the invention relates to a device internal to the pylon allowing both a reduction in the noise created by the pylon and a cooling of the turbomachine.

2. Description of the Related Art

FIG. 1 shows an aircraft equipped with two propellers 9 of the type known as "propfan". The propfan propellers comprise a turbomachine each housed in a nacelle 7 fixed by support struts 1, also known as pylons, to a fuselage 8 of the aircraft.

The turbomachine of a propfan propeller comprises two counter-rotating rotors each comprising a set of equidistant blades 92a, 92b, and positioned in the rear part of the propeller.

The pylon is an aerodynamic fairing that surrounds the structure supporting the turbomachine and, amongst others, allows the fuel, electrical, hydraulic, and air systems to be routed between the turbomachine and the aircraft.

Although it has an aerodynamic profile, the pylon causes vortices in its wake when the aircraft is in flight.

The vortices cause a variation in total pressure on the rotor blades, generating noise and vibration phenomena due to the interaction between the blades and the vortices.

Various solutions have been developed to reduce these phenomena.

To reduce the area subjected to the vortices and therefore reduce the noise induced by the pylon, it is known to blow pressurized air from the pylon into the vortices of said pylon's wake.

One can cite, amongst others, U.S. Pat. No. 5,156,353, which describes an example of an aircraft pylon comprising a slot at a trailing edge of the pylon allowing pressurized air to be blown into the vortices.

Generally, the blowing of air is achieved by collecting air at the turbomachine's compressors. This therefore represents an impact on the propulsive efficiency of the turbomachine.

Moreover, the turbomachine generates significant heat dissipation, mainly by mechanical friction, through its lubricating fluid.

It is clear that this heat must be dissipated to the outside environment to cool the engine.

Equipment mounted on the turbomachine, such as an electric generator, may also require cooling.

Various solutions have been developed to perform this cooling.

A first known solution, mainly for turbofan-type propellers, consists of installing a heat exchanger, called a volumetric heat exchanger, between an outer wall and an inner wall of the nacelle. An air inlet collects cold air from the cold air flow going through the turbomachine, to bring it inside said volumetric heat exchanger. After passing through the heat exchanger matrix, the air is ejected out of the nacelle through an air outlet. Such heat exchangers have not proved to be an optimal solution in terms of propulsive efficiency and of aerodynamic impact on the turbomachine. In effect, the air collection represents a direct loss of propulsive efficiency inasmuch as it contributes little or nothing to the engine's thrust. Moreover, the presence of an air inlet, one or more internal ducts and an air outlet generates load losses and disturbs the propeller's internal flow more or less significantly.

Another known solution consists of using an exchanger, called a surface exchanger, such as for example a plate heat exchanger. In particular a surface exchanger is known that locally takes the form of an inner wall of the nacelle or of an engine cover to which it is coupled. A first surface of the surface exchanger is coupled to the inner wall of the nacelle or to the engine cover, while a second surface is located in the flow of cold air flowing through the internal volume of the nacelle. The heat transported within the heat exchanger is transferred by thermal conduction to the inner surface of the plate forming the second surface of the plate heat exchanger. This hot plate is traversed by the flow of cold air flowing in the nacelle. The heat stored in the hot plate on the inner surface is thus dissipated by forced convection towards the propeller's airflow.

This solution still has an aerodynamic impact, but has the advantage, compared to the previous solution, of not collecting air from the flow through the turbomachine.

However, this solution cannot be transposed to propfan-type propellers. Indeed, when the aircraft speed is low or zero, there is little or no air flow traversing the surface exchanger, because the rotors are arranged outside the nacelle.

BRIEF SUMMARY OF THE INVENTION

The objective of this invention is thus to propose a device making it possible to reconcile both the reduction of the noise due to the pylon and ensure sufficient cooling of the turbomachine on the ground and in flight, while limiting the collection of air from the turbomachine.

To this end, the invention envisages an aircraft support pylon, designed to attach a turbomachine housed in a nacelle to an aircraft fuselage. The pylon comprises:
 a cooler able to be heated by a hot fluid, said hot fluid intended to be cooled by heat exchange with cold air outside said cooler,
 at least one duct for evacuating the air, at the exit from the cooler and extending longitudinally in an internal volume of the pylon to a trailing edge of the pylon.

The hot fluid to be cooled is, for example, lubricating oil for the gearbox and/or engine.

The cooler comprises:
 a first surface cooling means placed at an outer wall of a longitudinal panel of the pylon
 an air channeling means positioned in the internal volume of the pylon.

Advantageously, the first surface cooling means and the air channeling means are opposite on the same longitudinal panel.

In an example of realization of the invention, the hot fluid to be cooled circulates in the cooler, either in the first surface cooling means, or in the air channeling means.

In another example of realization of the invention, the hot fluid to be cooled circulates in the longitudinal panel, preferably between the first surface cooling means and the air channeling means. There is thus a thermal link between the cooler and a vein carrying the hot fluid, and the cooling of the hot fluid by the air channeling means and the first surface cooling means is performed by thermal conduction.

The choice of cooling the oil by the first surface cooling means alone and/or in some configurations the air channeling means may depend on flight parameters, such as for example, the flight phase and/or engine speed and/or the aircraft's operating parameters, such as for example, oil temperature.

In this description, the choice will be based on the aircraft's flight phases.

Preferably, the first surface cooling means is sized so as to be sufficient to ensure the desired cooling by itself when the aircraft is in flight, within preselected environmental and speed conditions, and the air channeling means is sized so as to be sufficient to ensure the desired cooling by itself when the aircraft is at low or zero speed, within preselected environmental conditions.

In an embodiment of the air channeling means, said channeling means is a surface cooling means installed at an inner wall of a longitudinal panel of the pylon and preferably comprising a set of fins to increase the efficiency of the heat exchange.

Preferably, the longitudinal panel on which the cooler is placed is the pylon's upper surface. Preferably, the cooler is positioned near a leading edge of the pylon because the exchanges with the outside air are greater there. It is also possible to place the cooler on the pylon's lower surface, also preferably near a leading edge of the pylon.

The pylon also comprises a pressurized-air collection duct, emerging downstream from the air channeling means in the at least one air evacuation duct. Preferably, the pressurized air is collected at the turbomachine, preferably at the exit from a high-pressure compressor to create a big enough vacuum to aspirate a necessary quantity of outside air.

Advantageously, the collection duct comprises, at the at least one air evacuation duct, an ejector that ejects the pressurized air in said at least one air evacuation duct, so as to allow a suction to be created at the exit from the air channeling means.

Advantageously, the pylon comprises an air outlet emerging at the outside of the pylon, at the trailing edge, and on which the at least one air evacuation duct is connected. The positioning of the air outlet at the trailing edge allows the pressurized air from the at least one air evacuation duct to be reused for pylon blowing, by injecting pressurized air into the vortices of the pylon's wake.

The pylon according to the invention thus makes it possible to ensure, on the one hand, that the hot liquid is cooled by the cooler and, on the other hand, that pressurized air is blown onto the boundary layer at the trailing edge via the air channeling means and the at least one evacuation duct.

It is therefore no longer necessary to make a first collection of pressurized air at the turbomachine's compressor for blowing onto the boundary layer and a second collection of air at the turbomachine for cooling the hot fluid, as currently done.

The pylon according to the invention thus makes it possible, firstly, to reconcile the reduction of the noise due to the pylon and, secondly, to ensure a sufficient cooling of the turbomachine on the ground and in flight, while limiting the collection of air from the turbomachine.

In an embodiment of the pylon, if the cooling requirement is not sufficiently met with just the cooler, the pylon has an additional surface cooling means placed on an outer wall opposite the outer wall of the longitudinal panel on which the first surface cooling means is placed. In the example of a cooler positioned on the pylon's upper surface, in this case it is possible to add an additional surface cooling means on the pylon's lower surface.

The invention also envisages an aircraft comprising a support pylon as set forth.

BRIEF DESCRIPTION OF THE SEVERAL VIEWS OF THE DRAWINGS

The description that will follow, given solely as an example of an embodiment of the invention, is made with reference to the figures included in an appendix, in which:

FIG. 6 illustrates in a detailed view the airflow in the cooling device when the aircraft is in flight, FIG. 7 illustrates in a detail view the airflow in the cooling device when the aircraft is in flight, in an embodiment of the invention.

DETAILED DESCRIPTION OF THE INVENTION

Figure 1:
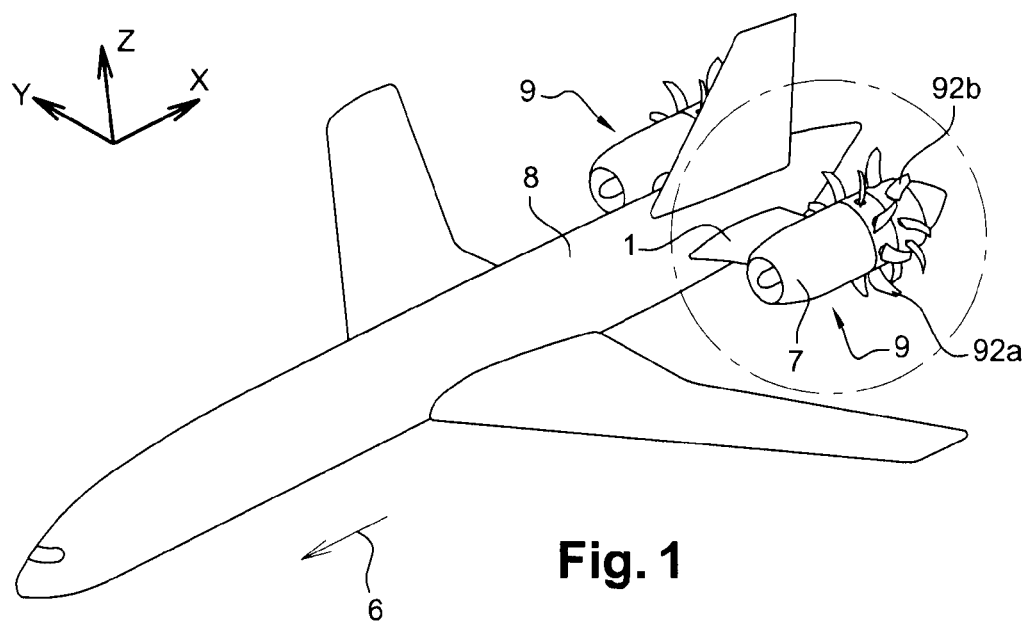
FIG. 1 illustrates a perspective view of an aircraft comprising two propfan propellers of the type known as "Propfan"

For the purpose of describing a particular embodiment of the invention, FIG. 1 presents and introduces an example of an aircraft comprising two propellers 9 of the type known as "propfan". The two propellers 9 are each housed in a nacelle 7 and fixed by support pylons 1 on either side of a fuselage 8 of said aircraft.

Figure 2:
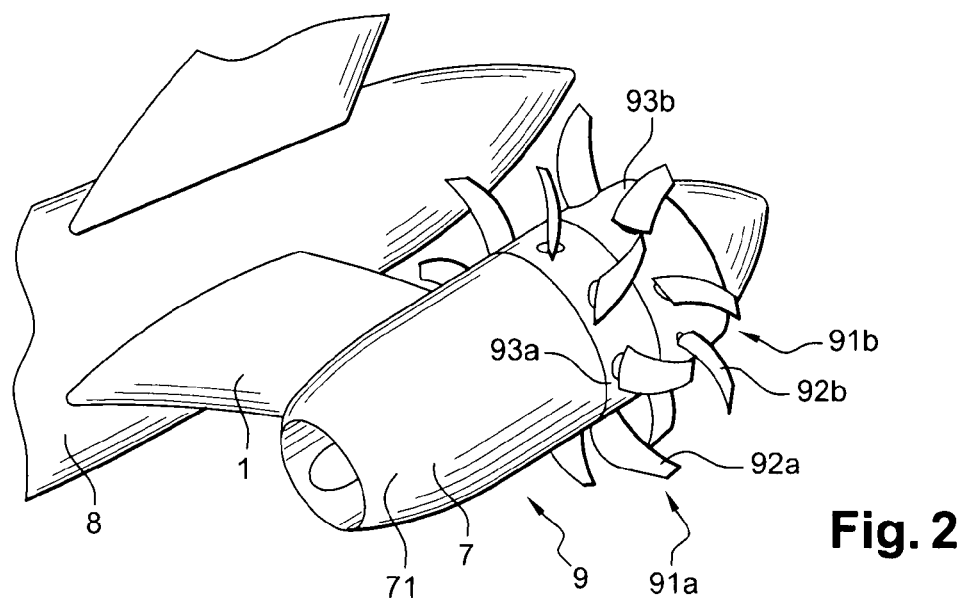
FIG. 2 shows an enlargement of FIG. 1 at a pylon-propeller assembly.

Each propfan propeller 9, as illustrated in FIG. 2, here comprises two counter-rotating rotors 91$a$, 91$b$ each comprising a set of equidistant blades 92$a$, 92$b$ and positioned in the rear part of the propeller 9. The blades 92$a$, 92$b$ of each rotor 91$a$, 91$b$ protrude from an annular crown 93$a$, 93$b$, which is mobile with this rotor, an outer surface of which is located in the continuity of an outer wall 71 of the nacelle 7 of the propeller 9.

Each propeller 9 supplies a turbomachine (not shown). The turbomachine comprises, conventionally, a multistage compressor allowing incremental increases in the pressure of air entering the turbomachine.

The constructional details of propfan propellers and their components—rotor, turbomachine, and their dimensions, materials etc.—are outside the framework of this invention. The elements described here are therefore provided only for information purposes, to facilitate understanding of the invention in one of its non-limiting examples of implementation.

Each pylon 1 comprises a rigid structure 10 substantially similar to those encountered in the pylons of the prior state of art.

The invention is described for a pylon, but the invention is equally applicable to all aircraft pylons.

Throughout the description that will follow, by convention, X refers to a longitudinal direction of support pylons 1, which is also comparable to a longitudinal direction of the aircraft. In addition, Y refers to a direction oriented transversely with respect to the support pylons and is also comparable to a transverse direction of the aircraft, and finally Z refers to a direction perpendicular to the X direction, said three directions X, Y and Z, being orthogonal to each other.

In addition, the terms "front" and "rear" are to be considered with respect to a direction of the aircraft's movement encountered subsequent to the thrust exerted by the turbomachines, this direction being shown schematically by an arrow referenced 6.

In addition, the term upstream will designate, at a given point, the portion that is located in front of this point with reference to the direction of the airflow in the pylon, and the term downstream will designate the portion that is located after this point.

Figure 3:
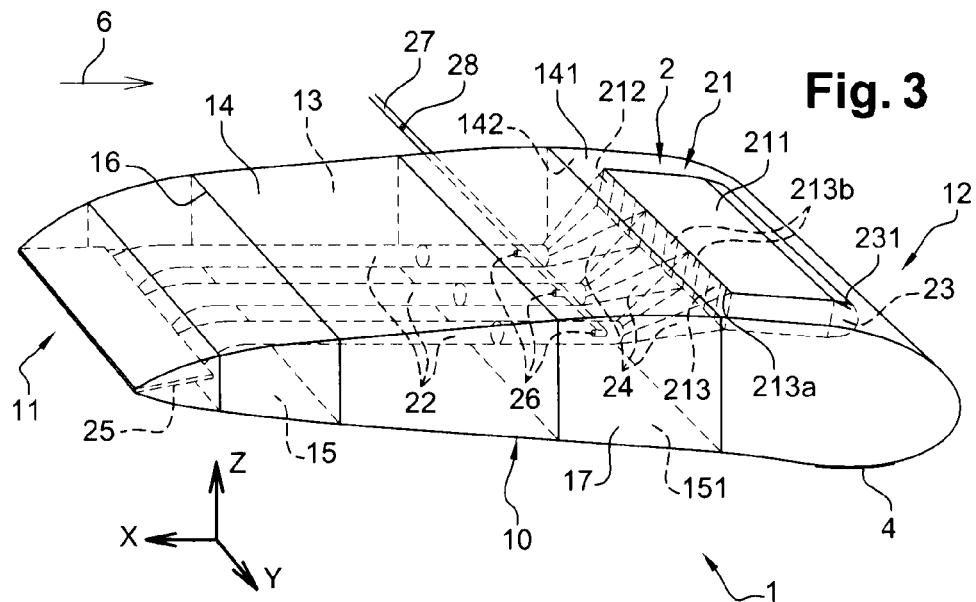
FIG. 3 is a detail view of the pylon, which highlights the main elements of a cooling device according to an embodiment of the invention.

As illustrated in FIG. 3, the rigid structure 10 of the pylon 1 has the form of a box extending in the direction X. It is conventionally formed by two lateral panels 17, 13, both extending along the X direction and substantially in a plane XZ, and two longitudinal panels, known as the upper surface 14 and lower surface 15, both extending along the X direction and substantially in a plane XY. Within this box, called hollow inner volume, spars 16 arranged along planes YZ and spaced longitudinally reinforce the stiffness of the box. It is noted for information purposes that the elements of the rigid structure 10 may each be made in one piece, or by the assembly of adjacent sections, which may possibly be slightly inclined with respect to each other.

Only the rigid structure 10 forming the box of the support pylon 1 has been shown in FIG. 3. Other constituent elements of this pylon not shown in the figure, such as for example means for attaching the rigid structure to the fuselage and means for attaching the rigid structure to the turbomachine, are conventional elements identical or similar to those encountered in the prior art and known to the man skilled in the art. Therefore, no detailed description of them will be given.

The pylon 1 has an aerodynamic profile to minimize the aerodynamic drag. The pylon 1 has transverse ends referred to as trailing edge 11, located on the rear of the pylon, and leading edge 12, located on the front of the pylon.

During the aircraft's flight, the outside air, whose temperature is between a maximum of +55° C. near the ground and a minimum of −74° C. at altitude, circulates along the outer wall 71 of the nacelle 7 of the propeller 9 and the outer walls 141, 151 of the longitudinal panels 14, 15 of the pylon 1, substantially in the direction opposite the direction of the aircraft's movement.

At the same time, the propeller 9 of the turbomachine generates a significant heat discharge, part of which is transferred to the oil circuits of the engine, of a gearbox, and must be evacuated by a suitable cooling device 2.

The cooling device 2, located on the support pylon, is specific to a particular embodiment of the present invention and will therefore be presented in a detailed way below.

The cooling device 2 comprises:

a cooler 21 able to be traversed by a hot fluid, intended to be cooled, and located substantially in the vicinity of the leading edge 12, air evacuation ducts 22, at the exit from the cooler 21 and extending longitudinally toward the trailing edge 11.

"Extending longitudinally" means that the air evacuation ducts 22 extend over a length of the pylon, substantially between the cooler and near the trailing edge 11. Preferably, the air evacuation ducts are rectilinear in order to limit load losses.

The cooler 21 comprises firstly a surface cooling means, known as the first surface cooling means 211, and secondly an air channeling means 212. The two means are preferably contiguous. The cooler 21 is traversed by the hot fluid, e.g. oil, to be cooled.

In this particular embodiment of the invention, the hot fluid to be cooled circulates through the first surface cooling means.

Obviously, it is possible to make the hot fluid circulate in the air channeling means without departing from the framework of the invention.

Similarly, the hot fluid to be cooled can circulate in the longitudinal panel, between the first surface cooling means and the air channeling means. There is thus a thermal link between the cooler and a vein carrying the hot fluid, and the cooling of the hot fluid by the air channeling means and the first surface cooling means is performed by thermal conduction.

The first surface cooling means 211 is designed to operate at "high" speed, i.e. mainly during flight phases, when the flow of outside air is significant and allows heat exchange over a smooth surface.

The first surface cooling means 211 is placed at an outer wall of a longitudinal panel of the pylon. Preferably, the first surface cooling means is placed at the outer wall 141 of the upper surface 14 of the pylon 1, as illustrated in FIG. 3. Obviously, the first surface cooling means may be placed at the outer wall 151 of the lower surface 15 of a pylon 1 without departing from the framework of the invention.

Preferably, the first surface cooling means 211 forms a portion of the outer wall 141 of the upper surface 14 of the pylon 1. The shape of the first surface cooling means 211 is determined by the shape of the outer wall 141 of the upper surface 14 of the pylon 1 where said first surface cooling means must be installed.

In an example of realization, the first surface cooling means 211 has a smooth surface, in the extension of the outer wall 141 of the upper surface 14 of the pylon 1, to minimize, even eliminate, any aerodynamic impact.

In another example of realization (not shown) of the first surface cooling means 211, said first surface cooling means comprises a set of fins starting from the outer wall of the pylon's upper surface and projecting on said outer wall of the pylon's upper surface.

For example, these fins allow the exchange area to be increased so as to improve the efficiency of the first surface cooling means 211, and are oriented substantially parallel to the flow lines of an air stream circulating over the outer surface of the pylon's upper surface when the aircraft is in flight, i.e. substantially along the X direction.

The dimensions of these fins are determined by the cooling requirement when the aircraft is in flight or at low speed, and by the flow of outside air and the temperature of the air circulating along the surface of these fins. The details of such a calculation are known to the man skilled in the art. Preferably, the dimension of these fins is limited to minimize the aerodynamic impact.

The air channeling means 212 is intended to operate at low speed, for example on the ground, during take-off or in approach phase, when the outside air flow is low or zero and a heat exchange carried out over a very large surface formed in a small volume is preferable.

The air channeling means 212 is attached to the first surface cooling means 211, at an inner wall 141 of the upper surface 14.

In an embodiment (not shown in the figures) of the air channeling means, said air channeling means is a surface cooling means, called second surface cooling means.

Advantageously, said second surface cooling means comprises a set of fins starting from the inside wall of the pylon's upper surface and projecting on the inner wall of the pylon's upper surface in the direction of the pylon's hollow inner volume.

For example, these fins allow the exchange area to be increased, and are oriented substantially parallel to the flow lines of an airflow circulating over the outer surface of the pylon's upper surface when the aircraft is at low speed, i.e. substantially along the X direction.

Preferably, the fins are confined in a box, open on the side to the outside of the pylon and on the other side to the air evacuation ducts 22, said box allowing the outside air to be channeled between the fins.

The dimensions of these fins are determined by the cooling requirement when the aircraft is on the ground or at low speed, and by the flow of outside air and the temperature of the air circulating along the surface of these fins. The details of such a calculation are known to the man skilled in the art.

In another embodiment of the air channeling means 212, shown in FIG. 3, said air channeling means is a volumetric cooling means 213.

The volumetric cooling means 213 is placed, in the present example, so that a first outer surface 213*a* extends the inner wall 142 of the upper surface 14 of the pylon 1, preferably by locally replacing this first wall.

The dimensions of the volumetric cooling means 213 are determined by the cooling requirement when the aircraft is on the ground or at low speeds, by the flow of outside air and the exchange surface formed within the volumetric cooling means. The calculation is known to the man skilled in the art and is therefore not detailed further here.

In an example of realization of the volumetric cooling means 213, said volumetric cooling means comprises a set of channels 213*b* for the passage of the outside air.

The volumetric cooling means 213 is composed, for example, of assembled strips, which thus delimit the outside air passage channels.

In an embodiment, the channels 213*b* are substantially parallel to each other and perpendicular to the first outer surface 213.

The volumetric cooling means 213 is made of a material with high heat conductivity, e.g. a metal alloy or composite material suitable for this purpose.

The surface cooling means 211 and volumetric cooling means 213 are known to the man skilled in the art and will not be developed further here.

The outside air is directed towards the air channeling means 212 by an air inlet duct 23 located, for example, upstream of said air channeling means.

The air inlet duct 23 comprises a means of opening/closing 231 said duct, preferably at the outer wall 141 of the upper surface 14 of the pylon 1. Thus, when said opening/closing means is in the closed position, it is in the extension of the outer wall 141 of the upper surface 14 and limits the impact of aerodynamic drag.

In an example of realization, said opening/closing means is a valve which preferably opens toward the air inlet duct 23, inside the pylon.

The air is channeled, at the exit from the air channeling means, by at least one bottleneck 24 each joining an air evacuation duct 22 which evacuates the air toward an outside of the pylon by an air outlet 25 located at the trailing edge 11.

In the example shown in FIG. 3, three air evacuation ducts 22 are shown at the exit from the air channeling means for evacuating the air toward the trailing edge 11.

The air evacuation duct number/diameter depends on the airflow required for cooling and or blowing air at the trailing edge and the need for uniformity of air suction in the air channeling means 212 so as to obtain maximum efficiency. However, in order not to encounter integration problems in the hollow inner volume of the pylon 1, or limit the structural constraints in the spars 16, there must not be too many air evacuation ducts.

The air outlet 25 of the air evacuation ducts is, for example, a transverse slot, shown in FIG. 3, opening to the outside of the pylon and onto which said air evacuation ducts are connected.

The cooling device 2 further comprises, downstream from the air channeling means 212, in each air evacuation duct 22, a pressurized air inlet 26. The pressurized air is collected from the turbomachine, preferably at the exit from the compressor, via a collection duct 27.

Advantageously, as shown in FIG. 3, a single collection duct 27 serves all the pressurized air inlets 26.

A regulator valve 28 is placed on said collection duct 27, upstream of the first air inlet 26. Said regulator valve is illustrated schematically here, designed to control the flow of pressurized air, collected at the compressor from a value close to zero to a maximum value determined by the cooling requirement of the gearbox and/or engine oil when the aircraft is immobilized on the ground.

Each pressurized air inlet 26 of the collection duct 27 in each air evacuation duct 22 is advantageously an ejector.

The ejection of the pressurized air produces a suction of the airflow coming from the air channeling means 212 and consequently generates a flow of cooling air passing through said air channeling means.

To avoid weakening the structural integrity of the spars by cutouts for the passage of the collection duct 27, said collection duct is routed in the fuselage of the aircraft.

In an embodiment, the collection duct 27 is routed in the engine. This embodiment advantageously allows a single ejector to be placed at the motor instead of one ejector in each evacuation duct 24, thus generating weight savings and simplifying the pylon's implementation.

Figure 4:
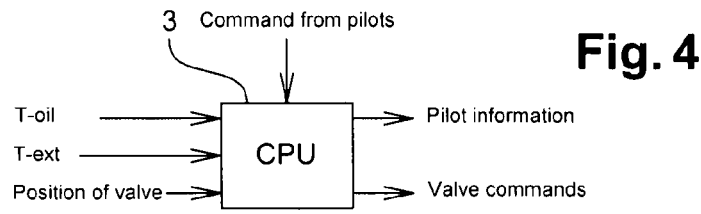
FIG. 4 illustrates schematically the data processed by the electronic control unit of the cooling device according to the invention.

In addition, the cooling device is controlled by an electronic control unit 3 (shown in FIG. 4), of a type known per se.

In this non-limiting example, said electronic control unit receives as input temperature data from the oil circuits that the cooling device must regulate, as well as data concerning the outside air temperature, aircraft speed etc.

Said electronic control unit transmits control data, e.g. temperature of the oil circuits, to the aircraft's cockpit, from which it also receives instructions.

The electronic control unit 3 sets the regulator valve 28 according to various input information. It also receives status information concerning said regulator valve.

The opening/closing means 231 can also be controlled by the electronic control unit 3.

This electronic control unit can be installed for example at the propeller 9. Alternatively, the electronic control unit 19 may be part of the various pieces of electronic equipment located in the cockpit, or simply be one of the functions provided by one of the multi-purpose computer usually found in aircraft.

In an embodiment, when the flow of oil can circulate either in the first surface cooling means or in the air channeling means, the cooling device 2 comprises a regulator valve (not shown in the figures), called the oil flow regulator valve, designed to direct the flow of oil to be cooled either towards the air channeling means or towards the first surface cooling means, depending on the speed, low or high, of the aircraft. Said oil flow regulator valve is controlled by the electronic control unit.

Operating Mode

Figure 5:
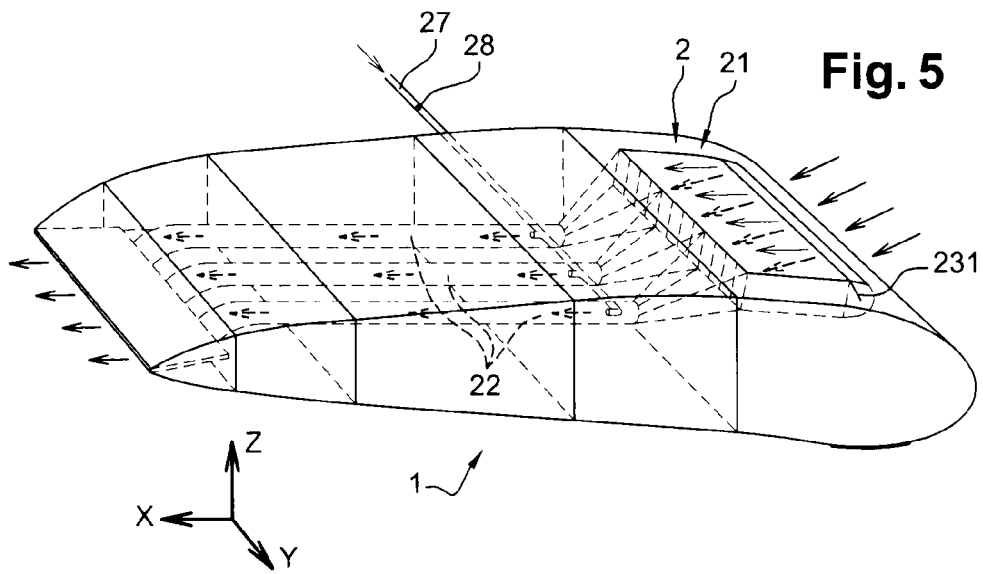
FIG. 5 illustrates a detailed view of the airflow in the cooling device when the aircraft is at low speed.

In operation, when the aircraft is in low speed phases (FIG. 5), the thermal discharge from the electrical generator is very large and the aircraft speed is low or zero.

During these low-speed phases, the flow of outside air is low and insufficient for cooling by the surface cooling means 211 and the air channeling means 212. The electronic control unit 19 therefore sets the regulator valve 28 substantially in the maximum open position, making it possible to create suction of the outside air at the exit from the air channeling means. Cooling is performed mainly by the air channeling means.

This ensures a heat exchange between the hot cooler 21 and the cold outside air, causing the desired cooling of the fluid circulating inside or connected to it by thermal conduction.

The invention with the configuration as described advantageously allows the air pressurized by the ejectors, collected at the compressor and exiting at the outside of the pylon 1 at the trailing edge 11 by the air outlet 25, to also be used for the pylon blowing.

Thus the invention advantageously makes it possible to combine two technologies, the pylon blowing and the cooling of fluids, by performing a single air collection at the turbomachine, thereby reducing the impact on performance.

As the climb progresses and evolves towards level flight, the speed of the aircraft increases and the outside air temperature decreases. Accordingly, the collection of air at the compressor is reduced by gradual closing of the regulator valve 28 controlled by the electronic control unit 3 and the cooling is performed increasingly by, firstly, the first surface cooling means 211 traversed by the outside air and, secondly, by the air channeling means 212 traversed by the outside air circulating naturally in the air inlet duct 23.

The closure (by extension the opening) of the regulator valve 28 is described as being gradual but it is also possible for the closure (by extension the opening) to be a fully on/fully off control.

Subsequently, when the aircraft is in steady flight (FIG. 6), the cooling is performed normally by the first surface cooling means 211 and the air channeling means 212 of the cooler 21, mainly by the first surface cooling means 211, and the regulator valve 28 thus remains closed, thereby eliminating the air collection from the compressor and therefore reducing the increased fuel consumption that otherwise arises from this power draw.

Eliminating the air collection from the compressor during the flight phase is not detrimental to the pylon blowing because in this flight phase, there is no noise constraint and the pylon blowing is therefore not necessary.

In an embodiment, when the air inlet duct 23 comprises the opening/closing means 231, the electronic control unit preferably sets the closing means in the closed position during flight phases. In closed position, the closing means limits the impact of aerodynamic drag. The cooling of the oil is therefore only carried out by the first surface cooling means.

In a variant of the invention, if the cooling requirement is not sufficiently met with just the cooling device, an additional surface cooling means 4 can be added on the outer wall 151 of the lower surface 15.

The scope of this invention is not limited to the details of the embodiments considered above as an example, but on the contrary extends to modifications in the reach of the man skilled in the art.

The invention is described in the case of a propfan-type propeller, but the invention is also applicable to turbofan-type propellers.

It is apparent from the description that the cooling device allows the engine components to be cooled across all phases, low speed and flight.

The coupling of the cooling of fluids and pylon blowing during phases on the ground or at low speed advantageously makes it possible to perform a single air collection from the turbomachine's compressor and thus to reduce the impact on performance.

The fact of managing the opening and closing of the regulator valve during the low-speed phase and during the flight allows the power draw on the compressor to be controlled, and to be reduced whenever possible, which translates into reduced consumption.

The invention claimed is:

1. A support pylon for an aircraft, designed to attach a turbomachine housed in a nacelle to an aircraft fuselage comprising:
a cooler, located substantially in a vicinity of a leading edge of the pylon, able to be heated by a hot liquid fluid, said hot liquid fluid intended to be cooled by heat exchange with cold air outside said cooler, the cooler including a first surface cooling means placed at an outer wall of a longitudinal panel of the pylon, and an air channeling means attached to the first surface cooling means at an inner wall of the longitudinal panel of the pylon and positioned in an internal volume of the pylon;
at least one air evacuation duct, at an exit from the cooler and extending longitudinally in the internal volume of the pylon to a trailing edge of the pylon;
a pressurized-air collection duct which collects pressurized-air from a compressor of the turbomachine emerging downstream from the air channeling means in the at least one air evacuation duct;
a regulator valve placed on the collection duct; and
an electronic control unit which controls the regulator valve,
wherein, when the aircraft is in a low speed phase, the electronic control unit substantially sets the regulator valve to a maximum open position so as to eject pressurized-air in the at least one air evacuation duct to produce a suction of an airflow coming from the air channeling means to generate a flow of cooling air passing through the air channeling means, and when the aircraft is in steady flight, the electronic control unit sets the regulator valve in a closed position.

2. The support pylon according to claim 1, wherein:
the first surface cooling means is sized so as to be sufficient to ensure cooling of the liquid fluid when the aircraft is in steady flight, within preselected environmental and speed conditions, and
the air channeling means is sized so as to be sufficient to ensure cooling of the liquid fluid when the aircraft is the low speed phase, within preselected environmental conditions.

3. The support pylon according to claim 1, wherein the air channeling means is a surface cooling means.

4. The support pylon according claim 1, wherein the longitudinal panel on which the first surface cooling means is placed is an upper surface of the pylon.

5. The support pylon according to claim 1, further comprising an air outlet emerging at the outside of the pylon, at the trailing edge, and on which the at least one air evacuation duct is connected.

6. The support pylon according to claim 1, further comprising an additional surface cooling means placed on an outer wall opposite the outer wall of the longitudinal panel on which the first surface cooling means is placed.

7. An aircraft comprising a support pylon according to claim 1.

8. The support pylon according to claim 1, further comprising a liquid fluid flow regulator valve which directs flow of the liquid fluid towards the first surface cooling means or towards the air channeling means, wherein the electronic control unit controls the liquid fluid flow regulator valve.

9. The support pylon according to claim 1, further comprising an air inlet duct which directs outside air towards the air channeling means, the air inlet duct being located upstream of the air channeling means.

10. The support pylon according to claim 9, wherein the air inlet duct includes an opening/closing valve which opens and closes the air inlet duct, the opening/closing valve is provided at an outer wall of an upper surface of the pylon.

11. The support pylon according to claim 1, wherein the first surface cooling means comprises a set of fins oriented substantially parallel to flow lines of an air stream circulating over the outer wall of the pylon when the aircraft is in flight.

* * * * *